Patented May 6, 1941

2,240,583

UNITED STATES PATENT OFFICE 2,240,583

MANUFACTURE OF ORGANIC CONDENSATION PRODUCTS

William J. Sparks, Cranford, and Donald C. Field, Roselle Park, N. J., assignors to Standard Oil Development Company, a corporation of Delaware No Drawing. Application May 5, 1939, Serial No. 271,960

14 Claims. (Cl. 260—2)

This invention relates to an improved process for carrying out reactions of the Friedel-Crafts type at low temperatures, and particularly to the use of improved catalysts in promoting such reactions.

The Friedel-Crafts type of synthesis is commonly conducted at ordinary or moderately elevated temperatures with metal halide catalysts such as aluminum chloride, and is used to condense organic halides with aromatic compounds in a reaction in which hydrogen halide is formed and the organic residue is connected to the aromatic nucleus by a carbon to carbon bond. The reaction may be illustrated empirically as follows:

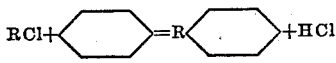

in which R represents an organic radical, and the hexagon represents an aromatic compound having a replaceable hydrogen attached to a carbon atom of the aromatic ring or nucleus. The organic halide preferably has the halogen attached to a carbon atom in an aliphatic group.

It has now been found that new and improved results are obtained by conducting such reactions at low temperatures below zero centigrade, and particularly between about 30° and 100° below zero centigrade, with metal halide catalysts which are dissolved or highly dispersed in suitable solvents or diluents such as carbon disulfide, methyl chloride, ethylene dichloride, chloroform, sulfuryl chloride ($SO_2Cl_2$), and the like which may act either as solvents for the catalysts or may form liquid complexes therewith. The amount of catalyst required is much less under these conditions than under the ordinary condition of the Friedel-Crafts synthesis. The progress of the reaction is much more easily controlled, and more uniform products of better color and quality are obtained. The process of this invention is also especially important in that it permits marked selectivity in the organic halides undergoing reaction, as it provides a method for reacting certain organic halides in the presence of saturated primary alkyl halides which do not enter into the condensation and polymerization reaction occurring under the condition of the process, but which act as solvents for the catalyst and the reaction products. In many cases, as will be shown below, the condensation may be conducted to yield products of very high molecular weight which are soluble in many common solvents and which have many valuable characteristics.

The organic halides suitable for use as reagents in the process of this invention are those halides which precipitate silver halide from alcoholic silver nitrate at room temperature. This test is described in the "The Systematic Identification of Organic Compounds" (1935) by Shriner and Fuson, at page 23. Examples of suitable organic halide reagents are the secondary alkyl halides such as isopropyl chloride, secondary butyl chloride and the like, the tertiary alkyl halides such as tertiary butyl chloride, tertiary amyl chloride and the like, also benzyl chloride, benzoyl chloride, methallyl (isobutenyl) chloride, and acyl chloride, allyl chloride, stearyl chloride and the like.

The saturated primary alkyl halides such as ethyl chloride are not used as reagents in the process of this invention but are useful as solvents or diluents, described hereinafter in connection with the catalysts.

While the process of this invention may be conducted in the presence of any of the metal halides suitable as catalysts in the Friedel-Crafts synthesis, such for example as aluminum bromide, titanium tetrachloride and the like, it has been found that aluminum chloride is especially preferred and particularly advantageous results are obtained when aluminum chloride is used in the presence of saturated primary alkyl halides, especially ethyl chloride and methyl chloride. Due to the low solubility of aluminum chloride in cold ethyl chloride, it is best to prepare the mixture of aluminum chloride in ethyl chloride at room or even somewhat higher temperatures but long storage at high temperatures is undesirable. Illustrative solubility data are given in the table below:

Solubility of aluminum chloride in ethyl chloride

| Sample | Temp. °C. | Contact time Minutes | $AlCl_3$ dissolved Percent |
|---|---|---|---|
| Ethyl chloride and excess aluminum chloride | −78 | 60 | 0.1 |
| Do | −45 | 45 | 0.1 |
| Do | 0 | 180 | 4.4 |
| Do | +8 | 60 | 5.4 |
| Do | +12 | 180 | 7.4 |

After a substantial amount of aluminum chloride has been dissolved in desired amount up to the saturation point, the solution, if not already of the proper concentration, may be adjusted by dilution with further solvent and then cooled down to the desired temperature for the catalytic reaction. Inasmuch as the $AlCl_3$—$C_2H_5Cl$ complex does not precipitate out of the ethyl chloride at low temperature, even though plain AlCl₃ has a very low solubility in ethyl chloride at such temperatures, it is believed that, when aluminum chloride is dissolved in ethyl chloride, some sort of chemical reaction takes place in producing a complex, and the latter is a substantially different compound than simple aluminum chloride. If desired, the

either separated as such or else dissolved in ethyl chloride, may be dissolved in or diluted with other solvents or diluents, such as methyl chloride, chloroform, etc.

Suitable catalyst concentrations range from about 8% to about 0.5% of aluminum chloride or in methyl chloride.

The reaction temperature is preferably maintained by addition of a volatile refrigerant which is substantially inert under the conditions of the reaction and which removes heat by evaporation at about the reaction temperature desired. Normally gaseous hydrocarbons, such as ethane, ethylene, propane, butane, and mixtures thereof, are suitable. Carbon dioxide, in liquid or solid form, may also be used. The reaction may be conducted under elevated or sub-atmospheric pressure, thus controlling the boiling point of the refrigerant used.

This invention is especially suitable for preparing high molecular weight products from an organic halide and an aromatic compound, at least one of which contains another reactive group in addition to the halogen or the replaceable nuclear hydrogen indicated in the formula first given herein for the ordinary Friedel-Crafts synthesis. For example, the organic halide may be also unsaturated as is the case with allyl halides; the organic halide may contain two or more halogen groups illustrated by chlorinated wax which contains alkyl dichlorides and alkyl trichlorides; the aromatic compound may have a reactive group attached to the aromatic nucleus illustrated by aralkyl halides such as benzyl chloride, and by aryl olefins such as styrene. Especially desirable products are obtained when such aralkyl compounds containing both nuclear replaceable hydrogen and an alkyl group having an olefin linkage or a halogen atom are brought into reaction with organic halides in which the halogen is connected to a secondary or tertiary carbon atom in an alkyl group. These reactions are illustrated as follows:

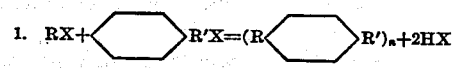

in which R and R' represent alkyl groups, X represents a halogen, and n is an integer above 1 and is usually a much larger number.

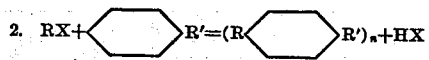

in which R represents an alkyl group, X represents a halogen, R' represents an unsaturated alkyl group, and n is an integer above 1 and is usually a much larger number. When using such reagents in the process of this invention, the resulting reactions appear to involve a fargoing polymerization as well as condensation, and the resulting products range in properties from viscous liquids to solid resins.

While the above equations call for equimolal proportions of the reagents, these proportions may be varied widely in the processes described herein, for example, from about 10% to 90% (molal basis) of the organic halide based on the total mols of organic halide and aromatic reagent used, proportions ranging from 25% to 75% of the organic halide being preferred. This invention is illustrated in the following examples:

EXAMPLE 1

100 cc. xylene (boiling point, 143° C.) and 100 cc. tertiary butyl chloride (boiling point, 51° C.) were placed in a 1 liter flask and cooled with 200 cc. liquid propane (boiling point, −40° C.). 200 cc. of ethyl chloride was saturated with AlCl₃ at +12.5° C., cooled with 200 cc. liquid propane, and poured slowly with stirring into the above mixture. The liquids boiled vigorously, evolving much HCl. After standing for 5 minutes, the whole mass was poured slowly into 1 liter of hot water, thus boiling away the propane and hydrolyzing the catalyst. The product was separated from the water and the materials boiling up to 143° C. were distilled off. The residue weighed 102 grams or 77.5% of the theoretical yield, and the distillation range was determined, readings being taken at 10% intervals as shown in the table below.

Table

| | degrees Fahrenheit |
|---|---|
| Initial B. P. | 306 |
| 5% off at | 328 |
| 10% off at | 336 |
| 20% off at | 350 |
| 30% off at | 368 |
| 40% off at | 384 |
| 50% off at | 396 |
| 60% off at | 402 |
| 70% off at | 406 |
| 80% off at | 408 |
| 90% off at | 418 |
| 95% off at | 465 |
| Final B. P. | 498 |
| Residue | per cent.. 3 |

EXAMPLE 2

20 gm. chlorinated wax (14% Cl) was dissolved in 200 cc. CCl₄ and 20 gms. naphthalene was added and dissolved. This mixture was cooled to −20° C. by addition of liquid propane and maintained at that temperature by addition of limited amounts of liquid propane as the reaction progressed. 100 cc. of concentrated AlCl₃—EtCl catalyst (approx. 7% AlCl₃), cooled with 100 cc. liquid propane, was added slowly. A vigorous reaction ensued with evolution of much HCl. The products were washed with alcohol and dried on a steam bath overnight. A dark gummy material was recovered.

EXAMPLE 3

10 parts by volume of chlorinated wax (14% Cl) and 10 parts of monomeric styrene were dissolved in 20 parts of petroleum ether and cooled with 40 parts of liquid propane. 20 parts of a 1% solution of AlCl₃ dissolved in ethyl chloride and cooled with 20 parts of liquid propane, was added. The reaction was vigorous with evolution of HCl. The product was washed with alcohol and dried. It was a white brittle, powdery product which softened upon heating. It was insoluble in all solvents. Analysis showed it to contain 29% of aliphatic material.

EXAMPLE 4

10 parts by volume of monomeric styrene and 20 parts of tertiary butyl chloride were mixed and cooled with 30 parts of liquid propane. 20 parts of a 1% solution of AlCl₃ in ethyl chloride were cooled with 20 parts propane and added to the above mixture. The reaction was vigorous with evolution of HCl. The product was washed with alcohol and dried. It was a white resin, soluble in hydrocarbons and in lube oils. Analysis showed that it contained 38% of butane in combined form.

This resin may be used generally as a substitute for polystyrene. It is considerably cheaper due to the inclusion of the tertiary alkyl halide. This resin may be used in surface coating compositions such as paints, varnishes and lacquers, in beer can liners, in coating cardboard containers, for impregnating cloth, leather, paper, wood and pressed insulating board, for impregnating and as an adhesive in preparing laminated materials and generally as an adhesive in sealing compounds. It may be compounded with high molecular weight viscous liquid to solid olefin polymerization products characterized by long straight carbon chains such as the polymers obtained on polymerizing isobutylene with boron fluoride at low temperatures below about $-10°$ C. and particularly between $-40$ and $-100°$ C. It may also be compounded with chlorinated polymers of this type, with hard resins, synthetic plastics, neoprene, Thiokol, rubber, hydro rubber, moulding plastics, glues and waxes. It may be blended with lubricating oils and greases for the purpose of improving their viscosity characteristics, as indicated in the following example.

EXAMPLE 5

A blend containing 2% of the product prepared in the preceding example in a refined petroleum lubricating oil, S. A. E. 20W grade, was compared with the unblended lubricating oil. The viscosity characteristics of the blend and the unblended oil were as follows:

| | Viscosity-Saybolt seconds at— | | Viscosity index |
|---|---|---|---|
| | 100° F. | 210° F. | |
| Lubricating oil | 275.8 | 45.9 | 13 |
| Blend | 293.8 | 47.3 | 31 |

EXAMPLE 6

10 gms. monomeric styrene and 10 gms. of benzyl chloride were diluted with 40 cc. liquid propane at atmospheric pressure and treated with 25 cc. of a 2% solution of AlCl₃ dissolved in ethyl chloride cooled with 25 cc. of liquid propane. The reaction was vigorous with evolution of HCl. The product was washed with alcohol and dried in a vacuum oven at 100° C. The resin formed was almost clear having a slight yellow tinge. It melted at 110° C., and was soluble in light hydrocarbons and chlorinated solvents. This resin may also be used as a substitute for polystyrene and for the uses described above for the resins of Example 4.

EXAMPLE 7

10 parts by volume of benzyl chloride and 50 parts of $t$-butyl chloride were mixed and cooled with 100 parts of liquid propane at atmospheric pressure. To this mixture was then added carefully 25 parts of a solution of AlCl₃ in ethyl chloride (2% by wt.) which had been cooled with 25 parts by liquid propane. The reaction was vigorous with evolution of HCl. The product was washed with alcohol and dried in a vacuum oven at 100° C. It was a light yellow resin, soluble in light hydrocarbons and chlorinated solvents. Analysis showed that it contained 14% of aliphatic hydrocarbon (butane) in combined form. This resin may also be used as a substitute for polystyrene and for the uses described above for the resins of Example 4.

This invention is not to be limited by any specific examples or theoretical explanations presented herein, all such being intended solely for purpose of illustration, but is limited only by the following claims in which it is desired to claim all novelty in so far as the prior art permits.

We claim:

1. An improved process for preparing organic condensation products comprising bringing an organic halide, which is capable of precipitating silver halide from an alcoholic silver nitrate solution at room temperature, and an aromatic compound having a replaceable hydrogen attached to the aromatic nucleus, into reaction at a temperature below about 0° C. in the presence of a catalyst of the Friedel-Crafts type and a solvent therefor.

2. The process for preparing organic condensation products comprising bringing an alkyl halide, which is capable of precipitating silver halide from an alcoholic silver nitrate solution at room temperature, into reaction with an aromatic hydrocarbon having a replaceable hydrogen connected to the aromatic nucleus, at a temperature below about 0° C. in the presence of a solution of a Friedel-Crafts catalyst in a solvent therefor.

3. Process according to claim 2 in which said catalyst solution is a solution of aluminum chloride in an alkyl chloride.

4. Process according to claim 2 in which said catalyst solution is a solution of aluminum chloride in ethyl chloride.

5. Process according to claim 2 in which said reaction temperature is between about $-30$ and $-100°$ C.

6. The process for preparing organic condensation products comprising bringing an alkyl halide, which is capable of precipitating silver halide from an alcoholic silver nitrate at room temperature, into reaction with an aromatic hydrocarbon having a replaceable hydrogen attached to the nucleus, at a temperature below about 0° C. in the presence of a solution of a Friedel-Crafts catalyst in a primary alkyl chloride.

7. Process according to claim 6 in which said alkyl halide has a halogen connected to carbon which is connected to at least two other carbon atoms of the molecule.

8. Process according to claim 6 in which said alkyl halide is a tertiary alkyl chloride.

9. Process for preparing organic condensation products comprising bringing an organic halide, which is capable of precipitating silver halide from an alcoholic silver nitrate solution at room temperature, into reaction with an aromatic compound having a replaceable hydrogen attached to the aromatic nucleus, at a temperature below about 0° C. in the presence of an organic diluent which boils at the reaction temperature and of a solution of a Friedel-Crafts catalyst in a solvent therefor.

10. Process according to claim 9 in which said organic halide is an alkyl halide having the halogen joined to a carbon atom which is connected to at least two other carbon atoms of the molecule.

11. Process according to claim 9 in which said organic halide is a tertiary alkyl halide.

12. Process according to claim 9 in which said aromatic compound is an aromatic hydrocarbon.

13. Process according to claim 9 in which said organic compound is an aralkyl olefin.

14. Process for producing high molecular weight condensation and polymerization products comprising bringing a tertiary alkyl halide into reaction with a polymerizable aralkyl compound at a temperature below about 0° C. in the presence of a catalyst of the Friedel-Crafts type and a solvent therefor.

WILLIAM J. SPARKS.
DONALD C. FIELD.